United States Patent [19]

Baker

[11] Patent Number: 5,536,107
[45] Date of Patent: Jul. 16, 1996

[54] ATTACHMENT DEVICE FOR SWIMMING POOL SKIMMER

[76] Inventor: Thomas E. Baker, 4000 Davano Rd., Sherman Oaks, Calif. 91423

[21] Appl. No.: 420,512

[22] Filed: Apr. 10, 1995

[51] Int. Cl.⁶ .................................................. A01K 75/00
[52] U.S. Cl. ........................ 403/389; 403/373; 403/261; 210/470; 210/464
[58] Field of Search .................... 210/232, 169, 210/464, 470, 473, 474, 477, 499; 15/145, 144.4, 144.1, 141.1, 143.1; 403/373, 379, 391, 389, 264, 261, 256

[56] References Cited

U.S. PATENT DOCUMENTS

| 678,585 | 7/1901 | Preston | 15/141.1 |
|---|---|---|---|
| 1,891,920 | 12/1932 | Eaton | 403/391 X |
| 1,991,669 | 2/1935 | Hausman | 403/391 X |
| 1,997,685 | 4/1935 | Hertzberg | 15/145 |
| 2,668,971 | 2/1954 | Bagley | 15/145 |
| 2,852,798 | 9/1958 | Grossfeld | 15/145 X |
| 4,036,546 | 7/1977 | Thompson et al. | 403/373 X |
| 4,106,157 | 8/1978 | Baker | 210/470 X |
| 4,169,331 | 10/1979 | Baker | 210/471 X |
| 5,173,181 | 12/1992 | McFarland | 210/470 X |

*Primary Examiner*—Anthony Knight
*Attorney, Agent, or Firm*—Roger A. Marrs

[57] ABSTRACT

An attachment device is disclosed incorporating a self-returning hinge releasably joining a pair of prongs disposed on a basket frame with a flattened open end of a tubular handle member. A crimping device is carried at the joint operable to be forcibly compressed to crimp or frictionally engage the device with the flattened open end to secure the prongs in place. The frame and prongs are composed of a flexible spring metal so as to constitute a self-returning hinge when the frame is bent or pushed to-either side of a handle center line.

3 Claims, 2 Drawing Sheets

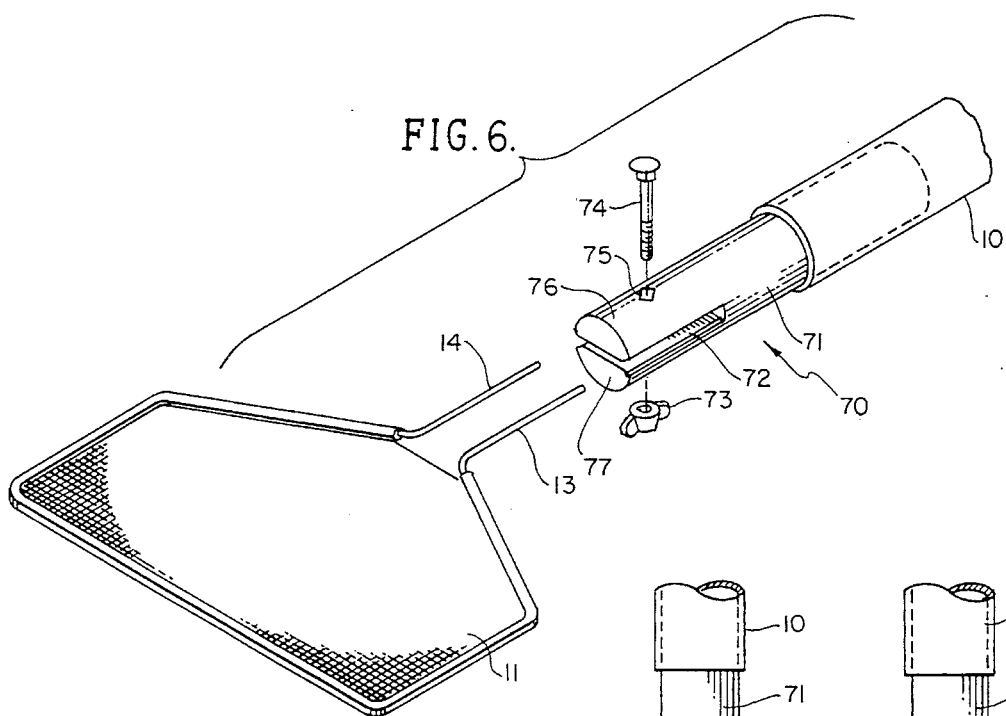
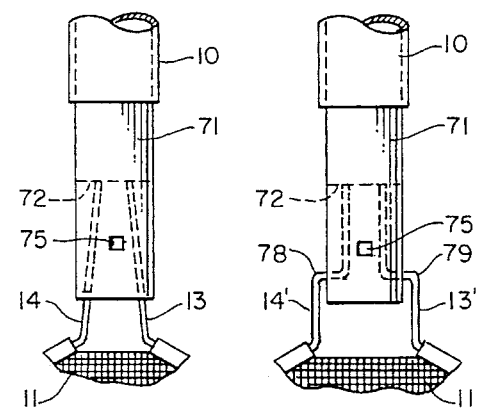
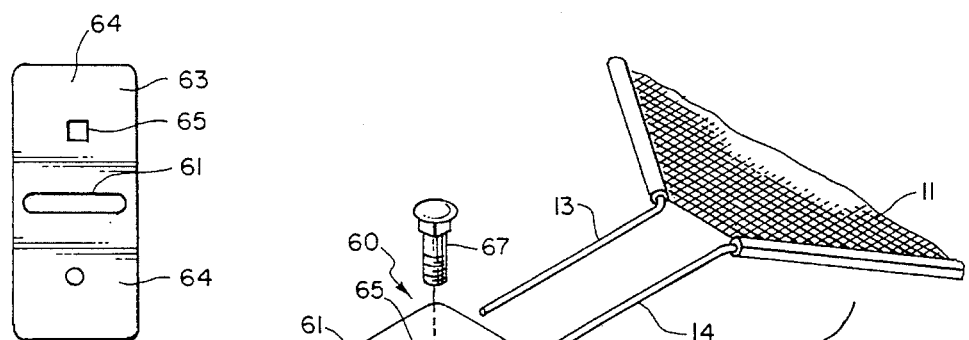
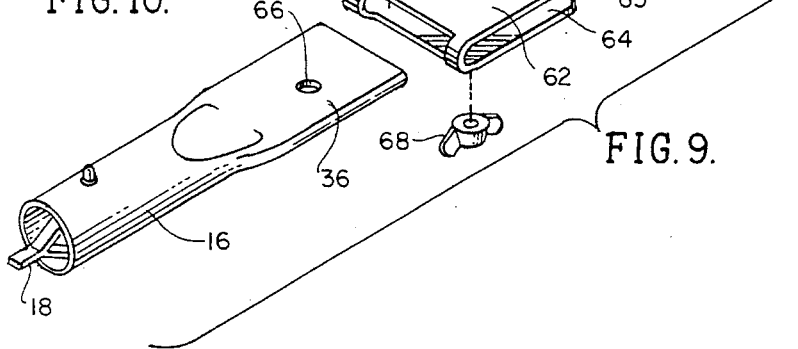

5,536,107

ATTACHMENT DEVICE FOR SWIMMING POOL SKIMMER

BACKGROUND OF THE INVENTION

1. Field of the Invention

The present invention relates to the field of swimming pool appliances, and more particularly to a novel attachment device for joining a tool or appliance to the end of a handle which permits detachable connection for tool or appliance replacement purposes.

2. Brief Description of the Prior Art

In the past, many attachment devices have been provided for securing a swimming pool tool or appliance to a handle, such as disclosed in U.S. Pat. Nos. 4,106,157 or 4,169,331. Although these prior devices have been useful for their intended purpose, problems and difficulties have been encountered which stem largely from the fact that the frame holding the tool or appliance is not readily releasably connected to the end of the handle so that changes can be made with ease and without the use of special tools. The tool or appliance requires replacement from time to time and it is preferred that such changeability take place at the pool site in a convenient manner. Such changeability is best performed by a person not requiring special skills and which may be accomplished with simple hand tools usually available at the home site.

Therefore, a long-standing need has existed to provide an attachment device for releasably securing a swimming pool tool or appliance to the end of a handle which is convenient and does not require special skills, and which will readily accommodate the joining of prongs carried on an appliance frame to a flattened tube ending so that the tool or appliance may be readily replaced or changed.

SUMMARY OF THE INVENTION

Accordingly, the above problems and difficulties are avoided by present invention which provides for a novel attachment device whereby a pair of prongs outwardly extending from the tool or appliance may be received into a flattened open-ended tubular receptacle which includes crimping or clamping means disposed on either side of the joint which includes a threadable fastener that bears against the joint when tightened so as to releasably retain the prongs within the receptacle. In one form of the invention, the crimping or clamping device includes a pair of washers disposed and separated on opposite sides of the joint with the fastener passing therethrough. In another form of the invention, a clamp member of U-shaped configuration in side elevation is employed having flattened sections residing on opposite sides of the joint and having a fastening means disposed therethrough. In still a further embodiment, a plug member is employed having a slotted opening for insertably receiving the prongs of the appliance whereby cantilevered sections of the plug reside on opposite sides of the prongs and fastener means passes therethrough for applying clamping pressure.

Therefore, it is among the primary objects of the present invention to provide a novel attachment device for joining a swimming pool tool or appliance to a handle which includes a clamping or crimping means to releasably hold the appliance to the handle, and which may be released without special equipment or special skills.

Another object of the present invention is to provide a novel attachment device for releasably securing a swimming pool tool or appliance to the end of a handle whereby the device is changeable at the pool site.

Another object of the present invention is to provide a novel releasable clamping or crimping means for joining the prongs of a pool tool or appliance with the end of a handle employing a clamping pressure to hold the joint in place.

Still a further object of the present invention is to provide a novel attachment device for a swimming pool tool or appliance which is economical to manufacture and which is simple to install whereby the tool or appliance is removably and releasably attached to the end of a handle.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 6 is an exploded perspective view showing another version of the present invention employing a plug in the attachment device;

FIGS. 7 and 8 are enlarged plan views illustrating the assembly of the joint with the attachment device as illustrated in FIG. 6;

FIGS. 9 and 10 illustrate another version of the present invention using a clamp or crimping means similar to that illustrated in FIGS. 4 and 5.

DESCRIPTION OF THE PREFERRED EMBODIMENT

Referring to the figures, the present invention relates to a flexible hinge and attachment structure for connecting a swimming pool tool or appliance, such as a skimmer or scoop net, with a handle utilized to manipulate the working element.

Figure 1:
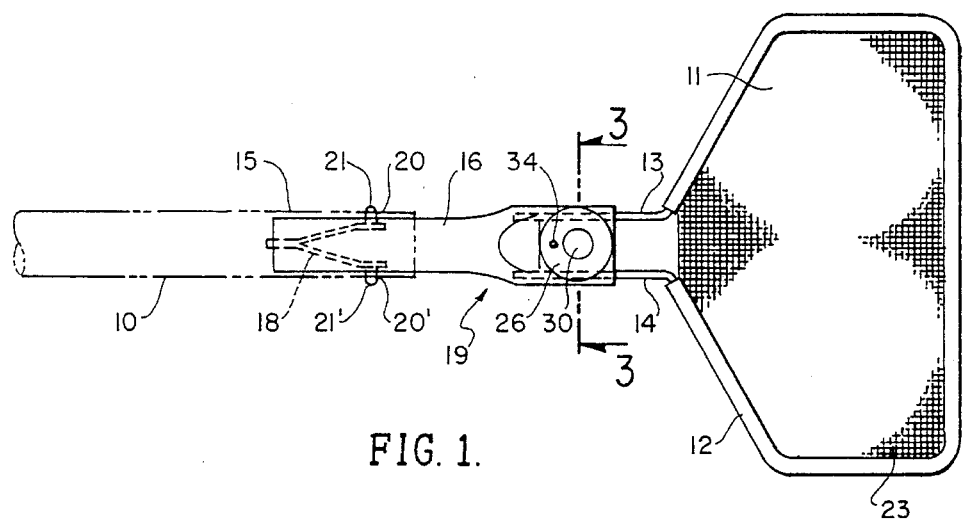
FIG. 1 is a top plan view illustrating the novel attachment device for a swimming pool tool or device incorporating the present invention.

Referring to FIG. 1, the handle is indicated by numeral 10 while the tool or implement or appliance intended to be manipulated is indicated by numeral 11 which takes the form of a net carried on a frame 12. The frame terminates in a pair of prongs 13 and 14 which are accepted into and held by an attachment device indicated in the direction of arrow 19.

The handle 10 is a hollow tubular member which may be a full length handle or it may be a short length of tubing to which an additional length of tubing may be suitably attached to provide the desired length. As is the conventional practice, the handle 10 has a working end which is adapted to receive the attachment means or device 19, which will be described hereinafter, and a second or connector end section 15 for connecting to a tubular extension 16. Connection of the handle 10 to the tubular extension may be made by any suitable means. For example, a standard V-shaped spring clip 18 having a pair of detents 20 and 20' projecting outwardly from the free ends thereof may be disposed within the connector end section 15 so that the spring-urged locking detents extend radially outwardly through a pair of aligned apertures 21 and 21' respectively which are defined by the connector section 15 along a diameter thereof. The handle extension 16 may be slipped over the depressible locking detents to snap the latter into locking position in the aligned openings respectively defined by the handle extension.

The skimmer 11 comprises an open frame formed into a desired shape with a net 23 suitably attached thereto and depending therefrom. The frame is formed from a resilient flexible metal which, because of its physical characteristics and diameter, can be bent into any desired shape, but which will retain the shape during normal skimmer use. The prongs 13 and 14 included with the frame are also composed of the resilient flexible metal material.

Figures 2, 3:
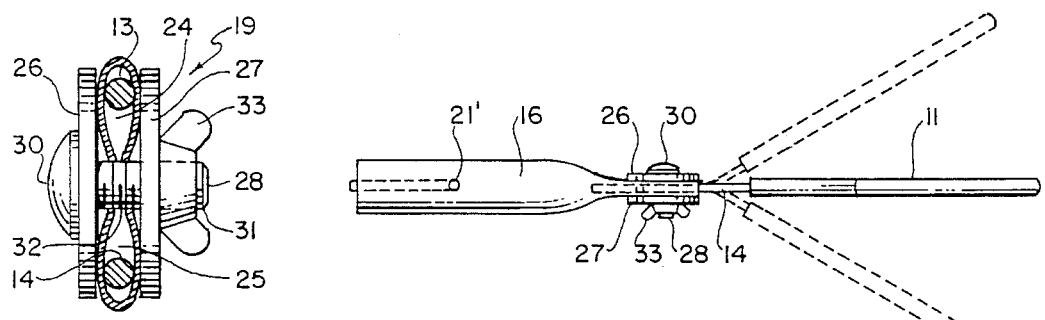
FIG. 2 is a side elevational view of the attachment device shown in FIG. 1 illustrating the self-returning feature of the joint.
FIG. 3 is an enlarged-transverse cross-sectional view of the attachment device shown in FIG. 1 as taken in the direction of arrows 3—3 thereof.

Referring now in detail to FIGS. 1–3 inclusive, the novel attachment means 14 of the present invention includes a selected end of the extension 16 being flattened, as shown in FIG. 3, so that the previous tubular construction defines a pair of receptacles indicated by numerals 24 and 25 suitable for insertably receiving the prongs 13 and 14 respectively. In this flattened configuration, the opposite sides of the tubular end are engaged with and between a pair of washers 26 and 27 which are drawn together in a crimping or clamping relationship by a threadable fastener 28. In a preferred form of the fastening means, a carriage bolt 30 is employed having a threaded shank 31 which passes through the washers 26 and 27 as well as through a pre-formed opening in the end of the extension section 16 which has been flattened. The opening is broadly indicated by numeral 32. Preferably, the opening in the washer 26 is of a square configuration in order to accommodate the square shoulder immediately under the head of the carriage bolt 30 so that the bolt will not slip during tightening by means of a thumbnut 33 threadably engaged with the shank 31 on the opposite side of the attachment means.

Therefore, it can be seen that upon placing the prongs 13 and 14 into the receptacles 24 and 25, followed by rotation of wingnut 33, the opposing surfaces of washers 26 and 27 will be drawn together against the opposite sides of the flattened end section of the extension 16. In so doing, the innersurface of the tubular section which has been flattened will bear against the prongs in a clamping action. In fact, the material of the tubular extension will or may deflect and physically deform to accommodate the clamping action. In order to retain the pair of washers in place when it is desired to unclamp or even remove the fastener 28, a spring roll pin 34 is included which passes through an opening in alignment with an opening in the washers and flattened portion of extension 16. The roll pin may be punched out when it is desired to remove the washers from installation on the extension section 16.

As illustrated in FIG. 3, the frame is composed of a flexible spring metal so that a hinge action is produced, as shown in broken lines, for the net or skimmer 11.

Figure 4:
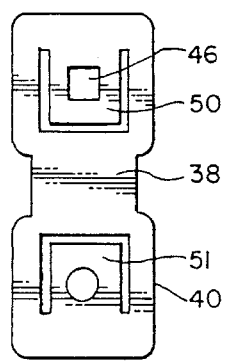
FIG. 4 is a top plan view of another embodiment of the present invention illustrating the pattern for the device.
Figure 5:
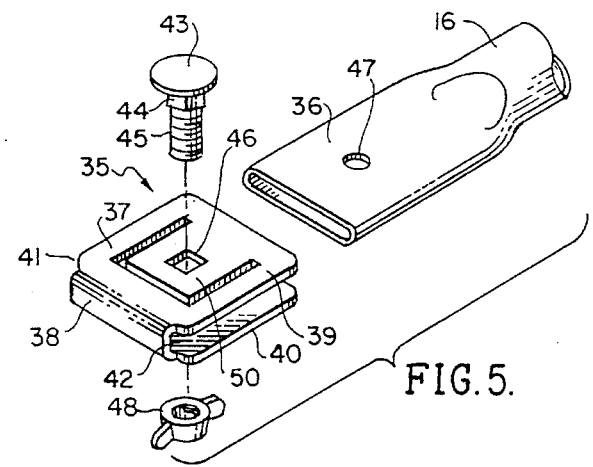
FIG. 5 is an exploded perspective view showing the device formed from the pattern of FIG. 4.

Referring to FIGS. 4 and 5, another embodiment of attachment means is illustrated in the general direction of arrow 35 which will releasably hold prongs 13 and 14 of the skimmer 11 in place on the end of extension 16. As illustrated, the extension is flattened in the same manner as previously described, and the flattened end is indicated by numeral 36. A U-shaped member 37 is slidably introduced over the end 36 until the terminating end bears against an end plate 38 separating an upper flange 39 and a lower flange 40. The end plate 38 is shorter than the width of the member so that opposite spaces 41 and 42 are available to insertably receive the prongs 13 and 14 respectively. Once the member 37 has been placed on the flattened end 36 of extension 16, a carriage bolt 43 having a square shoulder 44 and a threaded shank 45 is introduced through aligned openings 46 in the upper and lower flanges 39 and 40 and through the opening 47 in the flattened end 36 of extension 16. The shoulder 44 is fitted into the square opening 46 on the flange 39. When a thumb of wingnut 48 is threadably engaged with the threaded shank 45, the head 43 of the carriage bolt and the nut 48 will bear against the external surfaces of the flanges or plates 39 and 40. It is to be particularly noted that the central portion of the flanges or plates 39 and 40 include a flexible tang 50 and 51 which compress against the opposite sides of the flattened end 36 to cause the flattened end to crimp or clamp against the prongs which are inserted into the opening of the member 37 and in the hollow of the end 36. Thus, a clamping action is produced so that a strong interference fit exists between the inside surface of the flattened end and the prongs.

Referring now to FIGS. 9 and 10, another embodiment of the invention is illustrated in the general direction of arrow 60 wherein the prongs 13 and 14 of the skimmer 11 are introduced into the hollow of the flattened end 36 of the extension 16 by passing through an opening 61 in the end of a U-shaped member 62 having an upper plate 63 and a lower plate or flange 64. The plates or flanges include aligned central openings, such as the square opening 65, so as to be in alignment with a hole or opening 66 in the end 36. When the member 63 is inserted onto the end 36 by passing the end through opening 61, the holes in the member and the end 36 are in alignment so that the carriage bolt 67 can be passed therethrough in the same manner as described with respect to the embodiment shown in FIGS. 4 and 5. A wingnut 68 is used to effect a clamping action on the member 63 so that its respective plates will bear against and crimp or clamp against the flattened end 36 causing it to grip the prongs 13 and 14.

Another embodiment. Of the novel attachment means is shown in FIGS. 6, 7 and 8 and is indicated in the general direction of arrow 70. This embodiment includes a cylindrical plug 71 having a through slot 72 for insertably receiving the prongs 13 and 14 of the skimmer 11. A clamping action is produced by means of threading the nut 73 onto the threaded shank of carriage bolt 74, as previously described. A central opening passes through the entire plug and is indicated by numeral 75. The shank of the carriage bolt enters the opening, passes between the prongs 13 and 14 within the slot 72, and continues through an aligned opening within the plug for threadable engagement with the nut 73. The slot 72 provides an upper section 76 and a lower section 77. By tightening the nut 73, the two plug sections are drawn together to engage with and hold the prongs 13 and 14.

With respect to FIGS. 7 and 8, different prongs are illustrated in that in FIG. 7 the prongs 13 and 14 are somewhat parallel to one another while in FIG. 8, the prongs are stepped at numerals 78 and 79 within the slot 72.

In view of the foregoing, it can be seen that the prongs 13 and 14 of the skimmer 11 can be removably connected and attached to the end of the extension 16 by either the arrangement shown in FIGS. 1–3 or in FIGS. 4–5 or FIGS. 9 and 10 or FIGS. 6–8 inclusive. Each of these ways is economical and provides a crimping or clamping action against the prongs once they are inserted into the extension whether the extension be a plug, such as plug 71, or a flattened end piece 36 connected with tube 16. The resultant connection, provides for flexibility and extablishes a hinge action, such as shown in broken lines in FIG. 2.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an attachment means for releasably joining a flattened end of a tubular extension with a pair of prongs carried on a skimmer frame, the combination comprising:

said flattened end having opposite flat surfaces separated by an opening defining at least one receptacle for insertably receiving said pair of prongs;

clamping means detachably disposed on said flattened end engageable with said opposite flat surfaces for adjustably applying a compressive clamping force urging said flattened end into gripping engagement with said prongs;

said clamping means includes a clamp member having a pair of plates joined by an end piece wherein said plates having opposing flat surfaces defining a receptacle therebetween for insertably receiving said flattened end; and a threaded bolt and nut arrangement extending through said plates adapted to apply a clamping force thereto to crimp or squeeze said flattened end into holding relationship with said prongs.

2. The invention as defined in claim 1 wherein:

said end piece is provided with a central slot communicating with said receptacle.

3. The invention as defined in claim 1 wherein:

said end piece includes a central solid element separating a pair of openings for insertably receiving said prongs.

* * * * *